United States Patent [19]

Norling

[11] Patent Number: 4,718,275
[45] Date of Patent: Jan. 12, 1988

[54] ACCELEROMETER WITH FLOATING BEAM TEMPERATURE COMPENSATION

[75] Inventor: Brian L. Norling, Mill Creek, Wash.

[73] Assignee: Sundstrand Data Control, Inc., Redmond, Wash.

[21] Appl. No.: 879,290

[22] Filed: Jun. 27, 1986

[51] Int. Cl.[4] .............................................. G01P 15/10
[52] U.S. Cl. ................................... 73/497; 73/517 AV
[58] Field of Search .............. 73/497, 517 R, 517 AV; 310/329, 346

[56] References Cited

U.S. PATENT DOCUMENTS

| | | | |
|---|---|---|---|
| 3,440,888 | 4/1969 | Southworth, Jr. et al. | 73/517 |
| 3,465,597 | 9/1969 | Riordan et al. | 73/517 |
| 3,486,383 | 12/1969 | Riordan | 73/517 |
| 3,902,374 | 9/1975 | Hoffman et al. | 73/517 AV |
| 4,221,131 | 9/1980 | Albert | 73/517 |
| 4,467,651 | 8/1984 | Peters et al. | 73/497 |
| 4,479,385 | 10/1984 | Koehler | 73/517 |
| 4,517,841 | 5/1985 | Peters et al. | 73/517 |

FOREIGN PATENT DOCUMENTS 3038660 5/1982 Fed. Rep. of Germany .... 73/517 R

Primary Examiner—John Chapman
Attorney, Agent, or Firm—Christensen, O'Connor, Johnson & Kindness

[57] ABSTRACT

An accelerometer with a pivoting beam to accommodate differential thermal effects. The accelerometer measures acceleration along a sensitive axis, and comprises a housing, a proof mass, support means and a coupling assembly. The support means mounts the proof mass with respect to the housing. The coupling assembly is connected to the proof mass and housing, and comprises a beam and first and second force sensing elements. The beam is mounted for pivotal movement about a compensation axis normal to the sensitive axis. The first and second force sensing elements are connected to the pivot member at spaced-apart connection points on opposite sides of the compensation axis from one another, such that an acceleration along the sensitive axis results in respective compression and tension forces on the force sensing elements, and such that differential thermal expansion results in rotation of the beam about the compensation axis.

22 Claims, 7 Drawing Figures

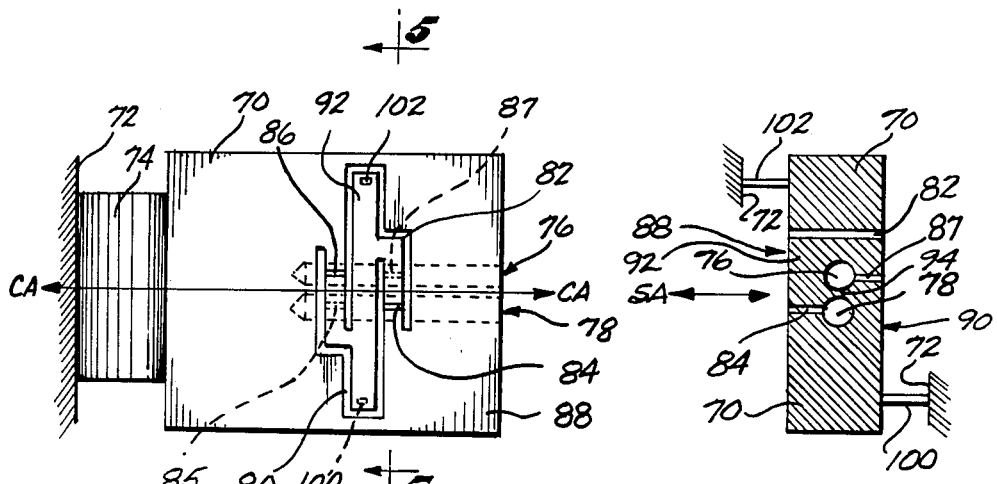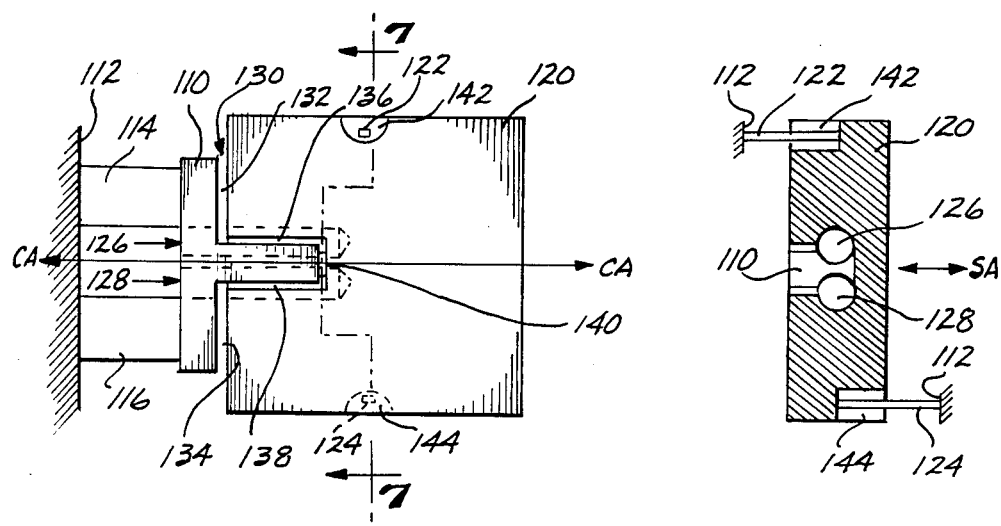

4,718,275

ACCELEROMETER WITH FLOATING BEAM TEMPERATURE COMPENSATION

TECHNICAL FIELD

The present invention relates to accelerometers and, in particular, to an accelerometer in which movement of a proof mass is constrained by a force transducer.

BACKGROUND OF THE INVENTION

In one type of prior accelerometer, a proof mass is mounted to a housing by a flexure hinge, and a force transducer is connected along the accelerometer's sensitive axis between the proof mass and the housing. An acceleration along the sensitive axis results in a compression or tension force on the force transducer. This force is converted into an electrical signal that indicates both the direction and magnitude of the acceleration.

In an accelerometer of the type described above, the coefficient of thermal expansion of the force transducer in general cannot be precisely matched by the coefficient of thermal expansion of the proof mass and housing. As a result, the proof mass moves relative to the housing as the temperature changes. This thermally induced movement has a number of adverse effects on the operation of the accelerometer. The flexure hinge resists the thermally induced movement and thereby causes a change in the bias of the instrument. A change in the axis alignment of the accelerometer also occurs as the thermally induced movement causes the position of the center of gravity of the proof mass to change relative to the housing. In addition, the thermally induced movement results in changes in the damping gap and the shock gap clearances between the proof mass and housing, thereby modifying the damping and limiting functions respectively of these components.

One method of providing temperature compensation for such an accelerometer is described in the U.S. patent application entitled Temperature Compensation of an Accelerometer, Ser. No. 879,262, Brian E. Norling, Inventor, filed concurrently herewith. This technique involves connecting two force transducers between the housing and the proof mass in such a way that differential thermal expansion or contraction results in rotation of the proof mass about a compensation axis normal to the sensitive axis. Such rotation is resisted by the flexure hinge, resulting in equal forces applied to both force transducers. The equal forces produce a common mode signal that can be eliminated by appropriate signal processing.

The twisting of a flexure hinge caused by thermally induced proof mass rotation produces certain side effects that may limit the usefulness of the described technique for certain applications. These side effects include a change in the compliance of the flexure to sensitive axis acceleration, and a resulting change in the accelerometer scale factor. Flexure twisting may also lead to a bias/temperature component in the accelerometer output. Axis alignment may also be influenced by flexure twisting. The reaction forces on the force transducers due to the flexure twisting may produce accelerometer output errors due to nonlinearities and inequalities in the force transducers. Finally, the torsional compliance of the flexure hinge may result in the flexure hinge being less rigid in one or both orthogonal axes, thereby reducing the mechanical natural frequencies of the accelerometer and limiting the accelerometer's g-range.

SUMMARY OF THE INVENTION

The present invention provides an accelerometer in which the movement of a proof mass in constrained by two force transducers. The proof mass is coupled to a housing through the force transducers and through a pivot member such that differential thermal expansion is accommodated by pivot member rotation. As a result, errors due to temperature changes are significantly reduced in comparison to prior accelerometers.

In one embodiment, the accelerometer is adapted to measure acceleration along a sensitive axis, and comprises a housing, a proof mass, support means and a coupling assembly. The support means mounts the proof mass with respect to the housing. The coupling assembly is connected to the proof mass and to the housing, and comprises a pivot member or beam and first and second force transducers. The pivot member is mounted for pivotal movement about a compensation axis normal to the sensitive axis. The first and second force transducers are connected to the pivot member at spaced-apart connection points on opposite sides of the compensation axis from one another, such that an acceleration along the sensitive axis results in a compression force on one force transducer and a tension force on the other force transducer, and such that differential thermal expansion or contraction between the force transducers and the other accelerometer components results in rotation of the pivot member about the compensation axis. In one preferred embodiment, the pivot member is pivotally connected to the proof mass, and each force transducer is connected between the housing and the pivot member. In a second preferred embodiment, the pivot member is pivotally connected to the housing, and each force transducer is connected between the pivot member and the proof mass.

BRIEF DESCRIPTION OF THE DRAWINGS

FIG. 4 is a top plan view illustrating a preferred embodiment of the accelerometer shown in FIG. 2;

FIG. 5 is a cross-sectional view taken along line 5—5 of FIG. 4;

FIG. 6 is a top plan view illustrating a second preferred embodiment of the accelerometer shown in FIG. 2; and FIG. 7 is a cross-sectional view taken along the line 7—7 of FIG. 6.

DETAILED DESCRIPTION OF THE INVENTION

Figure 1:
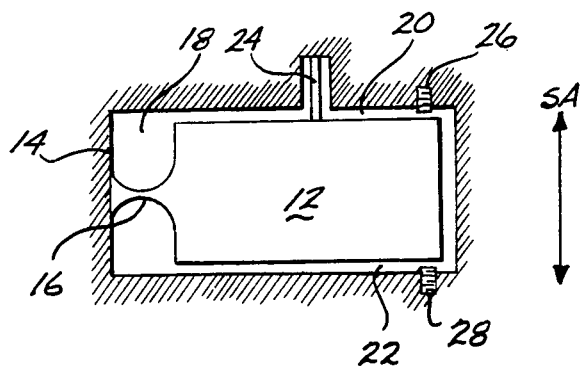
FIG. 1 is a cross-sectional view of a prior art accelerometer.

FIG. 1 illustrates a prior art accelerometer related to the accelerometer of the present invention. The accelerometer of FIG. 1 comprises proof mass 12 suspended from housing 14 by flexure hinge 16, and a force transducer comprising force sensing element 24 connected between the proof mass and housing. The proof mass, housing and flexure hinge are all preferably fabricated from a metal such as beryllium copper. Proof mass 12 is generally rectangular in shape, and occupies a similarly shaped but slightly larger cavity 18 within housing 14.

Flexure hinge 16 is adapted to permit movement of proof mass 12 upward and downward along sensitive axis SA, but to prevent significant movement of the proof mass in directions normal to the sensitive axis. Damping gaps 20 and 22 between housing 14 and the upper and lower surfaces respectively of proof mass 12 serve to damp unwanted vibrations of the proof mass by providing a limited path for the movement of air as the proof mass moves. The width of damping gaps 20 and 22, and the widths of the corresponding damping gaps of the other Figures, are exaggerated for the purpose of illustration.

Force sensing element 24 preferably comprises a quartz crystal having the double-ended tuning fork construction illustrated in U.S. Pat. No. 4,215,570. Such a crystal, in combination with a suitable drive circuit, comprises a vibrating beam force transducer having a resonant frequency that is a function of the axial force along the quartz crystal, i.e., along force sensing element 24. In particular, a compression force along the force sensing element produces a decrease in the resonant frequency of the force transducer, and a tension force exerted along the force sensing element results in an increase in the resonant frequency of the force transducer. Therefore, by connecting the force transducer output signal to a suitable frequency measurement circuit, the force exerted on force sensing element 24 by accelerations of proof mass 12 can be determined.

The accelerometer of FIG. 1 also includes shock stops 26 and 28 extending from housing 14 above and below proof mass 12 respectively. The shock stops limit the motion of the proof mass along sensitive axis SA, and thereby prevent damage to force sensing element 24 that might otherwise be produced by large (out-of-range) accelerations.

It is generally very difficult to match the coefficient of thermal expansion of force sensing element 24 to the coefficient of thermal expansion of the proof mass, housing and flexure hinge, particularly in the case where the force sensing element comprises a quartz crystal. A change in temperature of the accelerometer therefore generally results in movement of proof mass 12 along sensitive axis S, which movement is resisted by flexure hinge 16. As a result, a force is exerted on force sensing element 24 in the absence of, or in addition to, any forces that may occur due to accelerations, resulting in a temperature dependent bias error in the output of the accelerometer. Temperature induced movement of the proof mass also causes a change in the alignment of the sensitive axis and a change in the shock stop clearances.

Figure 2:
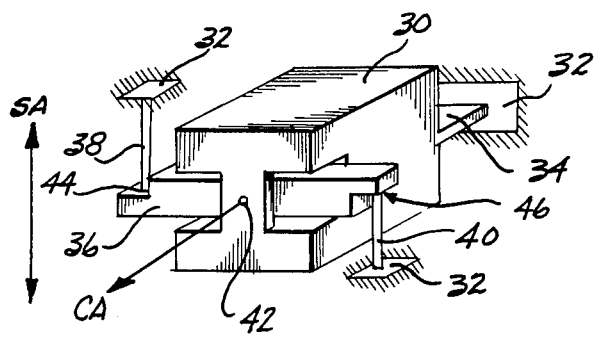
FIG. 2 is a conceptual view illustrating one preferred embodiment of the accelerometer of the present invention.

FIG. 2 presents a conceptual view of one embodiment of the accelerometer of the present invention. The accelerometer comprises proof mass 30 mounted to housing 32 by flexure hinge 34. As with the accelerometer of FIG. 1, flexure hinge 34 permits motion of proof mass 30 along sensitive axis SA. The accelerometer of FIG. 2 includes a coupling assembly comprising beam 36 and force sensing elements 38 and 40. Beam 36 is mounted to proof mass 30 at pivot 42. Each force sensing element has one end connected to beam 36 and its other end connected to housing 32. Force sensing elements 38 and 40 are connected to beam 36 at connection points 44 and 46 respectively, connection points 44 and 46 lying on opposite sides of pivot 42 from one another. Force sensing element 38 extends upward from beam 36 parallel to sensitive axis SA, and force sensing element 40 extends downward from the beam along the sensitive axis. Pivot 42 permits beam 36 to rotate with respect to the proof mass about compensation axis CA. Compensation axis CA is normal to sensitive axis SA and is also normal to a line that extends perpendicular to axis SA between connection points 44 and 46.

An acceleration along sensitive axis SA will result in a compression force on one force sensing element and a tension force on the other force sensing element. In a preferred embodiment in which each force sensing element comprises a portion of a vibrating beam force transducer, the result will be that the output signal frequency of one force transducer will decrease, and the output signal frequency of the other force transducer will increase. The acceleration may then be determined by means of a relationship such as:

$$a = A_1 f_1 - A_2 f_2 + A_0 \quad (1)$$

where $f_1$ and $f_2$ are the output signal frequencies of the two force transducers, and where $A_1$, $A_2$ and $A_0$ are constants determined through calibration procedures. More complex relationships between output signal frequencies and acceleration may also be used. In Equation (1), constants $A_1$ and $A_2$ represent the sensitivities of the respective force tranducers, and constant $A_0$ represents the bias or offset of the accelerometer. Since the force transducers are preferably as similar as possible to one another, constants $A_1$ and $A_2$ are typically nearly equal to one another. Suitable systems for determining acceleration according to Equation (1) are set forth in U.S. Pat. No. 4,467,651.

When the accelerometer of FIG. 2 is subjected to temperature changes, differential thermal expansion or contraction between the force sensing elements and the proof mass, beam, flexure hinge and housing will result in forces that will tend to rotate beam 36 about pivot 42. For example, if the thermal expansion of the force sensing elements if proportionally greater than the thermal expansion of the other components of the accelerometer, then force sensing element 38 will exert a downward force on beam 36 and force sensing element 40 will exert an upward force on the beam. These forces will combine to rotate the beam in a counterclockwise direction, as viewed in FIG. 2, around pivot 42. If pivot 42 does not resist such rotation, then the temperature change will not result in any force being exerted by the force sensing elements and beam on proof mass 30, and will therefore not result in a reaction force on the force sensing elements. The absence of a reaction force means that there will be no change in the output signals of the force sensing elements caused by the thermally induced movement. Furthermore, any net reaction force that does occur due to, for example, friction in pivot 42, will result in identical tension or compression forces on the force sensing elements that will cause the output signal frequencies of the transducers associated with the force sensing elements to be increased or reduced by approximately equal amounts. Referring to Equation (1) above, the frequency changes caused by the thermal expansion will tend to cancel, and as a result the differential thermal expansion will not cause significant errors in the measured acceleration.

Connection points 44 and 46 are preferably selected such that for a given temperature change, the quotient of the length change of the force sensing element divided by the distance between pivot 42 and the connection point for that force sensing element is the same as the corresponding quotient for the other force sensing element. By making such quotients equal, a given differential thermal expansion between the force sensing elements and the other accelerometer components will not tend to cause translational movement of proof mass 30. Equality of the quotients can readily be achieved by making the force sensing elements identical to one another and by making the distances to the connection points equal. However, in many applications, it may be desirable to make such distances unequal and to use different force sensing elements, while preserving the quotients constant, in order to minimize cross talk between the force sensing elements. The above analysis may be generalized by defining a thermal expansion coefficient equal to the change in position of the force transducer or force sensing element at the beam connection point divided by the temperature change that caused the position change. In this formulation, the quotient that is preferably kept constant between the force transducers or force sensing elements is the thermal expansion coefficient divided by the distance between the force transducer connection point and pivot 42.

A further consideration relating to the relative positions of the force sensing elements has to be with the stiffness of such elements. The stiffness of a force sensing element is equal to the force applied to the force sensing element along the sensitive axis divided by the resulting change of length of the force sensing element. Preferably, the product of the stiffness of each force sensing element multiplied by the distance between the center of mass of the proof mass plus beam and the connection point of the force sensing element is the same for both sensing elements. If such products are not the same, then the beam will tend to rotate in response to an acceleration along the sensitive axis. For most applications, it will be desirable to locate the center of gravity of the proof mass plus beam along compensation axis CA.

Figure 3:
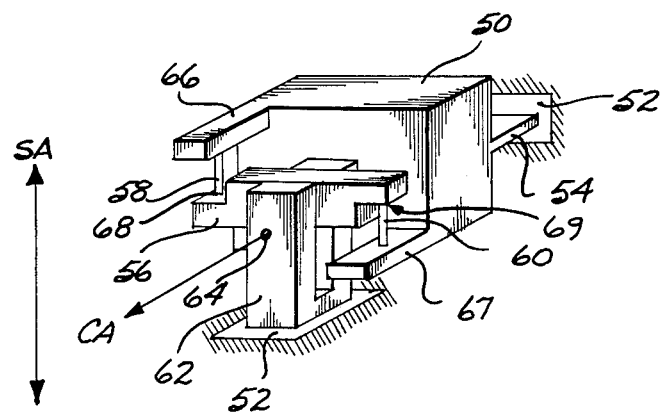
FIG. 3 is a conceptual view illustrating a second preferred embodiment of the accelerometer of the present invention.

A second embodiment of the present invention is illustrated in FIG. 3. The accelerometer of FIG. 3 includes proof mass 50 that is mounted to housing 52 by flexure hinge 54. The proof mass is also connected to the housing by a coupling assembly that comprises beam 56 and force sensing elements 58 and 60. Beam 56 is mounted to U-shaped bracket 62 at pivot 64 for rotational movement around compensation axis CA. Bracket 62 is in turn rigidly secured to housing 52. Arms 66 and 67 extend from proof mass 50 parallel to compensation axis CA. Force sensing element 58 is connected between arm 66 and one end of beam 56 at connection point 68, and force sensing element 60 is connected between arm 67 and the other end of beam 56 at connection point 69. Connection points 68 and 69 are spaced on opposite sides of pivot 64 from one another. Force sensing element 58 extends upward from connection point 68 to arm 66 along sensitive axis SA, while force sensing element 60 extends downward from connection point 69 to arm 67 along the sensitive axis.

An acceleration along sensitive axis SA results in proof mass 50 exerting a tension force on one force sensing element and a compression force on the other force sensing element. The resulting compression and tension forces result in a net force on beam 56 that is preferably balanced with respect to pivot 64, such that beam 56 does not rotate in response to an acceleration. However, differential thermal expansion of the force sensing elements with respect to the other accelerometer components results in similar foces (tension or compression) exerted on beam 56 by the force sensing elements, which forces tend to rotate the beam about pivot 64. As with the accelerometer of FIG. 2, if such rotation does not result in a reaction force, the output of the accelerometer will not be affected. To the extent that friction in pivot 64 does resist rotation of beam 56, the result will be identical forces acting on the force sensing elements, which forces will tend to cancel as per Equation (1) above.

As with the embodiment of FIG. 2, the quotient of the thermal expansion coefficient divided by the distance between pivot 64 and the connection point should be constant for the two force sensing elements. However, such coefficients and lengths may differ from one another, to reduce cross talk between the force sensing elements. The product of the stiffness times the distance between the pivot and the connection point is also preferably the same for the two force sensing elements.

FIGS. 4 and 5 illustrate a particular and preferred embodiment of the invention illustrated in FIG. 2. In the embodiment of FIGS. 4 and 5, proof mass 70 is supported from housing 72 by flexure hinge 74. Two closely spaced cylindrical openings 76 and 78 are cut into the side of proof mass 70 opposite flexure hinge 74, the openings beign parallel to compensation axis CA. Slots 80 and 82 are cut completely through proof mass 70 in a direction parallel to sensitive axis SA, the sensitive axis being normal to the plane of the drawing in FIG. 4. Slots 84-87 are cut partially into proof mass 70 parallel to the sensitive axis, each of slots 84-87 extending between slots 80 and 82 from the upper or lower face of the proof mass to one of the underlying cylindrical openings. In particular, slot 84 extends from the upper surface 88 of the proof mass to opening 78, slot 86 extends from upper surface 88 to opening 76, slot 85 extends from lower surface 90 of the proof mass to opening 78, and slot 87 extends from lower surface 90 to opening 76. As a result of this configuration, beam 92 is formed, beam 92 being connected to proof mass 70 at two aligned pivots or flexures, one pivot 94 being the material between openings 76 and 78 in the cross section shown in FIG. 5, and the other pivot being the material between openings 76 and 78 in a cross section (not shown) that intersects slots 85 and 86. Force sensing element 100 extends downward (as viewed in FIG. 4) from one end of beam 92 to housing 72, and a second force sensing element 102 extends upward from the opposite end of beam 92 to housing 72. The operation of the accelerometer illustrated in FIGS. 4 and 5 is identical to that described for the accelerometer of FIG. 2 above.

FIGS. 6 and 7 illustrate a second particular embodiment of the invention illustrated in FIG. 2. In the embodiment of FIGS. 6 and 7, proof mass 110 is supported from housing 112 by a pair of flexures 114 and 116. Proof mass 110 is in turn pivotally connected to pivot member 120, and the pivot member is connected to housing 112 through the force sensing elements 122 and 124. In the fabrication of the illustrated accelerometer, proof mass 110 and pivot member 120 are preferably fabricated from a single block of material. Two closely spaced cylindrical openings are first cut into the side of such block adjacent flexures 114 and 116, and then slot 130 is cut to form the proof mass and pivot member. Slot 130 includes outer sections 132 and 134 that are cut completely through the block, and inner sections 136, 138 and 140 that extend down to cylindrical openings 126 and 128. By reason of such slots and openings, pivot member 120 can rotate with respect to proof mass 110 about compensation axis CA. Force sensing elements 122 and 124 are connected to pivot element 120 at recesses 142 and 144 respectively. The operation of the embodiment of FIGS. 6 and 7 is identical to the operation of the embodiment of FIG. 2 and of FIGS. 4–5. The accelerometer shown in FIGS. 6 and 7 illustrates that the pivot member can include the major fraction of the seismic mass of the accelerometer.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. An accelerometer for measuring acceleration along a sensitive axis, comprising:
   a housing;
   a proof mass;
   support means for mounting the proof mass with respect to the housing; and
   a coupling assembly connected to the proof mass and to the housing, the coupling assembly comprising a pivot member mounted for pivotal movement about a compensation axis normal to the sensitive axis, and first and second force transducers, each force transducer having first and second ends, the first ends being connected to the pivot member at spaced-apart connection points on opposite sides of the compensation axis from one another, the second ends being connected to either the housing or the proof mass such that an acceleration along the sensitive axis results in a compression force on one force transducer and a tension force on the other force transducer, and such that differential thermal expansion or contraction between the force transducers and other accelerometer components results in rotation of the pivot member about the compensation axis.

2. The accelerometer of claim 1, wherein the force transducers extend from their respective connection points in opposite directions parallel to the sensitive axis.

3. The accelerometer of claim 2, wherein each force transducer is characterized by a thermal expansion coefficient such that for a given temperature change, the thermal expansion coefficient is equal to the change in position of the force transducer at the connection point divided by the temperature change, and wherein for each force transducer, the quotient of the thermal expansion coefficient divided by the distance between the force transducer's connection poit and the compensation axis is equal to the same quotient for the other force transducer.

4. The accelerometer of claim 3, wherein the length of the first force transducer is different from the length of the second force transducer.

5. The accelerometer of claim 3, wherein each force transducer is characterized by a stiffness such that for a given force exerted on the force transducer along the sensitive axis, the stiffness is equal to be magnitude of the force divided by the resulting change of length of the force transducer, and wherein the product of the stiffness of each force transducer multiplied by the distance between the force transducer's connection point and the compensation axis is equal to the same product for the other force transducer.

6. The accelerometer of claim 1, wherein each force transducer comprises a quartz crystal, each quartz crystal being coupled to a suitable drive circuit to form a vibrating beam force transducer.

7. The accelerometer of claim 1, wherein the support means comprises flexure means attached between the proof mass and the housing, the flexure means permitting rotation of the proof mass with respect to the housing about an axis normal to the sensitive axis and to the compensation axis.

8. An accelerometer for measuring acceleration along a sensitive axis, comprising:
   a housing;
   a proof mass;
   support means for mounting the proof mass with respect to the housing; and
   a coupling assembly connected to the proof mass and to the housing, the coupling assembly comprising a pivot member mounted to the proof mass for pivotal movement about a compensation axis normal to the sensitive axis, and first and second force transducers connected between the pivot member and the housing, the force transducers being connected to the pivot member at spaced-apart connection points on opposite sides of the compensation axis from one another such that an acceleration along the sensitive axis results in a compression force on one force transducer and a tension force on the other force transducer, and such that differential thermal expansion or contraction between the force transducers and the other accelerometer components results in rotation of the pivot member about the compensation axis.

9. The accelerometer of claim 8, wherein the force transducers extend from their respective connection points in opposite directions parallel the sensitive axis.

10. The accelerometer of claim 9, wherein each force transducer is characterized by a thermal expansion coefficient such that for a given temperature change, the thermal expansion coefficient is equal to the change in position of the force transducer at the connection point divided by the temperature change, and wherein for each force transducer, the quotient of the thermal expansion coefficient divided by the distance between the force transducer's connection point and the compensation axis is equal to the same quotient for the other force transducer.

11. The accelerometer of claim 10, wherein the length of the first force transducer is different from the length of the second force transducer.

12. The accelerometer of claim 10, wherein each force transducer is characterized by a stiffness such that for a given force exerted on the force transducer along the sensitive axis, the stiffness is equal to the magnitude of the force divided by the resulting change of length of the force transducer, and wherein the product of the stiffness of each force transducer multiplied by the distance between the force transducer's connection point and the compensation axis is equal to the same product for the other force transducer.

13. The accelerometer of claim 8, wherein each force transducer comprises a quartz crystal, each quartz crystal being coupled to a suitable drive circuit to form a vibrating beam force transducer.

14. The accelerometer of claim 8, wherein the support means comprises flexure means attached between the proof mass and the housing, the flexure means permitting rotation of the proof mass with respect to the housing about an axis normal to the sensitive axis and to the compenation axis.

15. The accelerometer of claim 8, wherein the proof mass has top and bottom surfaces that are generally parallel to one another and perpendicular to the senstive axis, and wherein the pivot member is formed from the proof mass by cutting slots in the proof mass between the top and bottom surfaces.

16. An accelerometer for measuring acceleration along a sensitive axis, comprising:
  a housing;
  a proof mass;
  support means for mounting the proof mass with respect to the housing; and
  a coupling assembly connected to the proof mass and to the housing, the coupling assembly comprising a pivot member mounted to the housing for pivotal movement about a compensation axis normal to the sensitive axis, and first and second force transducers connected between the proof mass and the pivot member, the force transducers being connected to the pivot member at spaced-apart connection points on opposite sides of the compensation axis from one another such that an acceleration along the sensitive axis results in a compression force on one force transducer and a tension force on the other force transducer, and such that differential thermal expansion or contraction between the force transducers and other accelerometer components results in rotation of the pivot member about the compensation axis.

17. The accelerometer of claim 16, wherein the force transducers extend from their respective connection points in opposite directions parallel the sensitive axis.

18. The accelerometer of claim 17, wherein each force transducer is characterized by a thermal expansion coefficient such that for a given temperature change, the thermal expansion coefficient is equal to the change in position of the force transducer at the connection point divided by the temperature change, and wherein for each force transducer, the quotient of the thermal expansion coefficient divided by the distance between the force transducer's connection point and the compensation axis is equal to the same quotient for the other force transducer.

19. The accelerometer of claim 18, wherein the length of the first force transducer is different from the length of the second force transducer.

20. The accelerometer of claim 18, wherein each force transducer is characterized by a stiffness such that for a given force exerted on the force transducer along the sensitive axis, the stiffness is equal to the magnitude of the force divided by the resulting change of length of the force transducer, and wherein the product of the stiffness of each force transducer multiplied by the distance between the force transducer's connection point and the compensation axis is equal to the same product for the other force transducer.

21. The accelerometer of claim 16, wherein each force transducer comprises a quartz crystal, each quartz crystal being coupled to a suitable drive circuit to form a vibrating beam force transducer.

22. The accelerometer of claim 16, wherein the support means comprises flexure means attached between the proof mass and the housing, the flexure means permitting rotation of the proof mass with respect to the housing about an axis normal to the sensitive axis and to the compensation axis.

* * * * *